United States Patent Office 3,112,993
Patented Dec. 3, 1963

3,112,993
PROCESS FOR PRODUCING STABLE AQUEOUS SOLUTIONS OF AMMONIUM CYANIDE
Izumi Hayashi, Kawasaki City, and Ryoji Iwanaga and Jiro Kato, Tokyo, Japan, assignors to Ajinomoto Co., Inc., Tokyo, Japan
No Drawing. Filed June 15, 1960, Ser. No. 36,169
4 Claims. (Cl. 23—79)

This invention relates to a process for producing a stable aqueous solution of ammonium cyanide, which can be stored and directly used for the synthesis of glutamic acid and other amino acids according to Strecker's reaction or for similar purposes without requiring distillation, concentration and other preliminary treatments. Other objects and advantages of this invention will become apparent from the following specification.

In the preparation of hydrogen cyanide from methane or other lower hydrocarbon and ammonia, from carbon monoxide and ammonia, or from other materials, the reacted gas is contacted with water in order to absorb the hydrogen cyanide. The aqueous solution, however, gradually turns brown and ultimately a dark coloured precipitate appears. This has been assumed to be due to the presence of unreacted ammonia. It has therefore been considered indispensible to remove ammonia with sulfuric acid or the like before absorption of the hydrogen cyanide in water. Many methods have been proposed for the separation of unreacted ammonia from a reaction mixture containing hydrogen cyanide, but safe storage or utilization of hydrogen cyanide without separating both compounds from each other has been considered impossible heretofore. If a stable solution of hydrogen cyanide containing unreacted ammonia could be obtained, the previous separation would be unnecessary and disadvantageous—especially where hydrogen cyanide and ammonia are to be used jointly as in the synthesis of amino acids according to Strecker's reaction. Since such a stable solution has been unavailable until now, refined hydrogen cyanide has been mixed with ammonia obtained separately.

As mentioned above, an aqueous solution of hydrogen cyanide and ammonia, or an aqueous solution of ammonium cyanide is extremely unstable. It tends to turn brown and to form a black precipitate on standing. We have found that dissolved ammonium cyanide is largely hydrolyzed. At 25° C., 48 percent, or about one half of the ammonium cyanide, is dissociated into $CN^-$ and $NH_4^+$ while the other half is hydrolyzed into HCN and $NH_4OH$. The non-dissociated HCN polymerizes because of the alkalinity of the solution. We have further found that the polymerization of hydrogen cyanide in the presence of ammonia in an aqueous solution is most noticeable when the mole ratio of ammonia to hydrogen cyanide is approximately between 0.5 and 1.0. Polymerization decreases with an increase of this ratio, and becomes negligible when said ratio is 5 or more, since most of the hydrogen cyanide is dissociated at such a mole ratio.

According to the present invention, which is based upon the above-mentioned findings, a gas mixture comprising hydrogen cyanide and ammonia is dissolved in water, ammonia being previously added to said gas mixture or said water, so that the molar concentration of ammonia is at least 5 times that of the hydrogen cyanide in the aqueous solution, whereby a stable aqueous solution of ammonium cyanide is obtained. In carrying out the present invention, a gas mixture comprising hydrogen cyanide and ammonia, which has been obtained by reacting ammonia with methane, another hydrocarbon, or carbon monoxide, may be contacted with an aqueous solution of ammonia in such a way that the mole concentration of ammonia in the solution formed is at least 5 times that of the hydrogen cyanide. Alternatively, such a reaction gas containing unreacted ammonia besides hydrogen cyanide is first mixed with a certain quantity of ammonia gas and the mixture is then dissolved in water or a dilute ammonia solution in the same way as mentioned above so that the mole concentration of ammonia in the solution formed is at least 5 times that of hydrogen cyanide.

The process for producing stable aqueous solutions of ammonium cyanide according to this invention may be continuously carried out by regulating the concentration and rate of flow of an aqueous solution of ammonia in response to the concentrations of hydrogen cyanide and ammonia in a reaction gas, so that the mole ratio of ammonia to hydrogen cyanide in the solution obtained has a value of 5 or more. Since hydrogen cyanide is present mostly as cyanide ion in the solution obtained according to this invention, hydrogen cyanide can be absorbed almost completely from the gas mixture and the concentration of hydrogen cyanide in the obtained solution can be substantially higher than that in an aqueous solution obtained by merely dissolving the reaction gas in water according to the heretofore known conventional process. The aqueous solution of ammonium cyanide produced according to this invention may be directly used in the synthesis of amino acids according to Strecker's reaction, requiring no preliminary treatment such as distillation, concentration and the like. The ammoniacal aqueous solution of ammonium cyanide according to this invention is a colourless or slightly yellowish, clear liquid. No change of HCN concentration nor separation of a dark precipitate can be observed, even if the solution stands at room temperature for several days. Moreover, it is by no means inferior to a solution prepared from pure hydrogen cyanide and pure ammonia, when used in the synthesis of amino acids from aldehyde by Strecker's reaction.

When an aqueous solution of ammonia is used as the absorbent for said reaction gas, a portion of the ammonia may volatilize. When the reaction gas is first mixed with ammonia gas and then dissolved in water, the hydrogen cyanide is completely absorbed but a portion of the ammonia may remain undissolved. However, the solubility of ammonia in water is extremely large, and the volatilized or undissolved ammonia gas may be completely recovered by contacting it with water.

The following examples illustrate the invention but are not to be construed as limiting the same:

*Example 1*

A mixed gas consisting of 32% of ammonia and 68% of a natural gas which contained 94% of methane was passed over an alumina catalyst at a temperature of about 1000° C. at a rate of 2.80 l./min. (as converted to 0° C. and 1 atm.; all gas volumes mentioned hereinafter are expressed similarly). 65.5% of said ammonia was converted into hydrogen cyanide, 12.5% of it was decomposed to nitrogen and 22% of it remained unreacted. After cooling to about 100° C., the reaction mixture gas was contacted counter-current with an aqueous 14.5 molar solution of ammonia at 10° C. When the ammonia water was used at a rate of 20 cc./min., an aqueous solution containing 1.32 mole/l. of hydrogen cyanide and 12.4 mole/l. of ammonia was obtained at a rate of 19.8 cc./min. It was a nearly colourless, clear solution of ammonium cyanide which showed neither colour change nor dark precipitate even after several days.

*Example 2*

A mixed gas of the same composition as in the foregoing example was contacted with the catalyst in a similar way. 63.0% of the ammonia was converted into hydrogen cyanide, 15.2% of it was decomposed to nitrogen and 21.8% of it remained unreacted. To the reaction mixture there was added ammonia gas at a rate of 5.60 l./min., and the combined gas was contacted with water counter-current at 3° C. When said water was used at a rate of 20 cc./min., an aqueous solution containing 1.24 mole/l. of hydrogen cyanide and 10.8 mole/l. of ammonia was obtained at a rate of 20.2 cc./min. It was a colourless and stable solution of ammonium cyanide similar to that obtained in Example 1.

Example 3

A mixed gas consisting of 11.2% ammonia, of 12.8% of a natural gas containing 94% methane, and of 76% air was passed over a platinum-rhodium screen at a rate of 8.0 l./min. 62.0% of said ammonia was converted into hydrogen cyanide, 16.3% of its was decomposed to nitrogen and 21.7% of it remained unreacted. After cooling to about 100° C., the reaction mixture was contacted counter-current at 3° C. with an aqueous solution of ammonia having a concentration of 14.5 mole/l. When the ammonia water was used at a rate of 20 cc./min., an aqueous solution containing 1.20 mole/l. of hydrogen cyanide and 10.7 mole/l. of ammonia was obtained at a rate of 20.7 cc./min. It was a colourless and stable solution of ammonium cyanide similar to that obtained in Example 1.

What we claim is:

1. A process for producing a stable aqueous solution of ammonium cyanide which comprises dissolving a gas mixture containing hydrogen cyanide and ammonia in water, said ammonia being present in said gas mixture in an amount sufficient that the molar concentration of ammonia in the aqueous solution obtained is at least 5 times the molar concentration of the hydrogen cyanide.

2. A process for producing a stable aqueous solution of ammonium cyanide which comprises washing a gas mixture containing hydrogen cyanide and ammonia with water; and adding ammonia to the thus obtained solution until the molar concentration of ammonia in said solution is at least 5 times the molar concentration of hydrogen cyanide in said solution.

3. A stable aqueous solution of ammonium cyanide containing more than 5 mole equivalents of ammonia for each mole equivalent of hydrogen cyanide.

4. A process for producing a stable aqueous solution of ammonium cyanide which comprises dissolving a gas mixture containing hydrogen cyanide and ammonia in an aqueous solution of ammonia, ammonia being present in said aqueous solution in an amount sufficient that the molar concentration of ammonia in the aqueous solution after dissolving of said gas mixture therein is at least five times the molar concentration of the hydrogen cyanide.

References Cited in the file of this patent

UNITED STATES PATENTS

| 1,178,081 | Layng | Apr. 4, 1916 |
| 1,652,874 | Poindexter | Dec. 13, 1927 |
| 2,069,543 | Adams et al. | Feb. 2, 1937 |

FOREIGN PATENTS

| 233,080 | Great Britain | May 7, 1925 |
| 718,112 | Great Britain | Nov. 10, 1954 |

OTHER REFERENCES

Harsh et al.: Journal Applied Chemistry, volume 7, pages 205–209, May 1957.